(12) United States Patent
Groover et al.

(10) Patent No.: US 11,512,577 B2
(45) Date of Patent: Nov. 29, 2022

(54) STEERABLE DRILLING BI-DIRECTIONAL COMMUNICATIONS SYSTEM AND METHODS

(71) Applicant: Nabors Drilling Technologies USA, Inc., Houston, TX (US)

(72) Inventors: Austin Groover, Spring, TX (US); Scott Coffey, Houston, TX (US); Drew Curran, Houston, TX (US); Adam Lacroix, Cypress, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 84 days.

(21) Appl. No.: 16/992,713

(22) Filed: Aug. 13, 2020

(65) Prior Publication Data

US 2022/0049594 A1    Feb. 17, 2022

(51) Int. Cl.
| | | |
|---|---|---|
| *E21B 44/02* | (2006.01) | |
| *H04L 67/12* | (2022.01) | |
| *E21B 47/024* | (2006.01) | |
| *E21B 45/00* | (2006.01) | |
| *E21B 7/06* | (2006.01) | |

(52) U.S. Cl.
CPC ............ *E21B 44/02* (2013.01); *E21B 7/06* (2013.01); *E21B 45/00* (2013.01); *E21B 47/024* (2013.01); *H04L 67/12* (2013.01)

(58) Field of Classification Search
CPC . E21B 44/02; E21B 7/06; E21B 45/00; E21B 47/024
See application file for complete search history.

(56) References Cited

U.S. PATENT DOCUMENTS

| | | | | |
|---|---|---|---|---|
| 2005/0107079 A1* | 5/2005 | Schultz | .................... | E21B 47/13 455/422.1 |
| 2015/0226052 A1* | 8/2015 | Samuel | ................. | E21B 47/022 700/275 |
| 2020/0063546 A1* | 2/2020 | Weideman | .............. | E21B 7/061 |

* cited by examiner

*Primary Examiner* — Dany E Akakpo
(74) *Attorney, Agent, or Firm* — Haynes and Boone, LLP (57) ABSTRACT

An apparatus and method of operating a drilling system with a directional guidance system and a drilling operation system is described. The directional guidance system and drilling operation system may engage in bi-directional communication during a slide drilling operation. This communication may be continual during the drilling operation. Parameters of the drilling instructions and the drilling operation system may be changed in response to these communications resulting in new instructions and changed slide drilling operations.

20 Claims, 6 Drawing Sheets

STEERABLE DRILLING BI-DIRECTIONAL COMMUNICATIONS SYSTEM AND METHODS

BACKGROUND

At the outset of a drilling operation, drillers typically establish a drilling plan that includes a target location and a drilling path, or well plan, to the target location. Once drilling commences, the bottom hole assembly is directed or "steered" from a vertical drilling path in any number of directions, to follow the proposed well plan. For example, to recover an underground hydrocarbon deposit, a well plan might include a vertical well to a point above the reservoir, then a directional or horizontal well that penetrates the deposit. The drilling operator may then steer the bit through both the vertical and horizontal aspects in accordance with the plan.

Conventionally, a drilling operator receives steering instructions for the bottom hole assembly by a computer system and these steering instructions are used one-way communication to direct the bottom hole assembly. Steering instructions are generally provided in the format of course length (distance to slide drill) at a toolface direction (0-360 degrees magnetic or 0-180 degrees gravity to orient the downhole bent motor housing). Throughout the drilling operation, conditions on the drilling rig or downhole may change, leading to errors in steering the bottom hole assembly during the drilling operation. Although the drilling operation may attempt to adjust the drilling operations based on these changed conditions, the corrections may not completely correct the errors, or in any case, may lead to inefficiencies in the drilling operation, such as non-essential wear to drilling tools or unpredictable/undesirable drilling directions; the number of sliding instances is increased due to inefficient drilling segments or other reasons, which can increase the time and cost of drilling to target; and the actual drilling path differs significantly from the well plan. Thus, a method and apparatus for bi-directional communication between guidance and execution systems on the drilling rig is needed.

SUMMARY OF THE INVENTION

In some embodiments, the present inventions includes a method of operating a drilling system, comprising: inputting a drill plan into a directional guidance system of the drilling system, the drill plan comprising a slide drilling operation; sending a drilling instruction from the directional guidance system to a drilling execution system in communication with a BHA of the drilling system to conduct a slide drilling operation; conducting, with the drilling execution system, the slide drilling operation according to the drilling instruction; conducting bi-directional communication between the directional guidance system and the drilling execution system during the slide drilling operation, the bi-directional communication comprising: sending a first signal from the drilling execution system to the directional guidance system comprising a parameter of the slide drilling operation; assessing the first signal with the directional guidance system to determine whether the parameter is within an acceptable range; if the parameter is not within the acceptable range, sending a second signal from the directional guidance system to the drilling execution system to change an aspect of the slide drilling operation; and conducting, with the drilling execution system, the slide drilling operation according to the second signal before the slide drilling operation is completed.

In some embodiments, the parameter of the slide drilling operation is one of a current slide score, a toolface distribution to target, a resultant slide vector, a current slide distance, a remaining slide distance, a bit proximity to steering line, an average rate of penetration, a current rate of penetration, qualitative information describing adherence of a wellbore of the slide drilling operation to the drill plan, real-time information about actual current inclination and azimuth of the BHA, and real-time information about projected inclination and azimuth of the BHA. The assessing the first signal with the directional guidance system to determine whether the parameter is within an acceptable range may account for criticality of directional control of the BHA. The assessing the first signal with the directional guidance system to determine whether the parameter is within an acceptable range may account for criticality of a drilled wellbore of the slide drilling operation as compared to the drill plan.

In some embodiments, the acceptable range is received by the directional guidance system with the drill plan. The aspect of the slide drilling operation may be a length of the slide distance. The aspect of the slide drilling operation may be a direction of the slide. The bi-directional communication between the directional guidance system and the drilling execution system may be continuous during the slide drilling operation.

In some embodiments, the present invention includes a method of operating a drilling rig, comprising: conducting a slide drilling operation with an execution drilling system of the drilling rig; sending a first signal from the drilling execution system to a directional guidance system on the drilling rig, the first signal including a measurement of the performance of the slide drilling operation; assessing the first signal with the directional guidance system; sending a second signal from the directional guidance system to the drilling execution system to vary a parameter of the slide drilling operation to improve the performance of the slide drilling operation; and conducting, with the drilling execution system, the slide drilling operation according to the second signal before the slide drilling operation is completed.

In some embodiments, the assessing the first signal with the directional guidance system accounts for criticality of directional control by the drilling execution system. The second signal may include a revised slide drilling instruction. The method may further include conducting bi-directional communication between the directional guidance system and the drilling execution system continuously during the slide drilling operation.

In some embodiments, the present invention includes a drilling apparatus comprising: a drill string comprising a plurality of tubulars and a bottom hole assembly (BHA) operable to perform a slide drilling operation; a directional guidance system configured to generate drilling instructions for the slide drilling operation; and a drilling execution system configured to direct the BHA to conduct a slide drilling operation according to the drilling instructions, wherein the directional guidance system and the drilling execution system engage in bi-directional communication during the slide drilling operation, comprising: sending a first signal from the drilling execution system to the directional guidance system that includes a parameter of the slide drilling operation; assessing the first signal with the directional guidance system to determine whether the parameter is within an acceptable range; if the parameter is not within the acceptable range, sending a second signal from the directional guidance system to the drilling execution system to change an aspect of the slide drilling operation; and conducting, with the drilling execution system, the slide drilling operation according to the second signal before the slide drilling operation is completed.

In some embodiments, the parameter of the slide drilling operation is one of a current slide score, a toolface distribution to target, a resultant slide vector, a current slide distance, a remaining slide distance, a bit proximity to steering line, an average rate of penetration, a current rate of penetration, qualitative information describing adherence of a wellbore of the slide drilling operation to a drill plan, real-time information about actual current inclination and azimuth of the BHA, and real-time information about projected inclination and azimuth of the BHA. The assessing the first signal with the directional guidance system to determine whether the parameter is within an acceptable range may account for the criticality of directional control of the BHA. The assessing the first signal with the directional guidance system to determine whether the parameter is within an acceptable range may account for the criticality of a drilled wellbore of the slide drilling operation as compared to a drill plan for the slide drilling operation.

In some embodiments, the acceptable range is received by the directional guidance system with a drill plan. The aspect of the slide drilling operation may be a length of the slide distance. The aspect of the slide drilling operation may be a direction of the slide. The bi-directional communication between the directional guidance system and the drilling execution system may be continuous during the slide drilling operation.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

It is to be understood that the present disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The apparatus and methods disclosed herein illustrate bi-directional communication between a directional guidance system and a drilling execution system on a drilling rig conducting a slide drilling operation. Instructions and measurements may be communicated by the bi-directional communication, which in turn prompt changes in parameters of the drilling instructions and the drilling operation resulting in new instructions and changed slide drilling operations.

Figure 1:
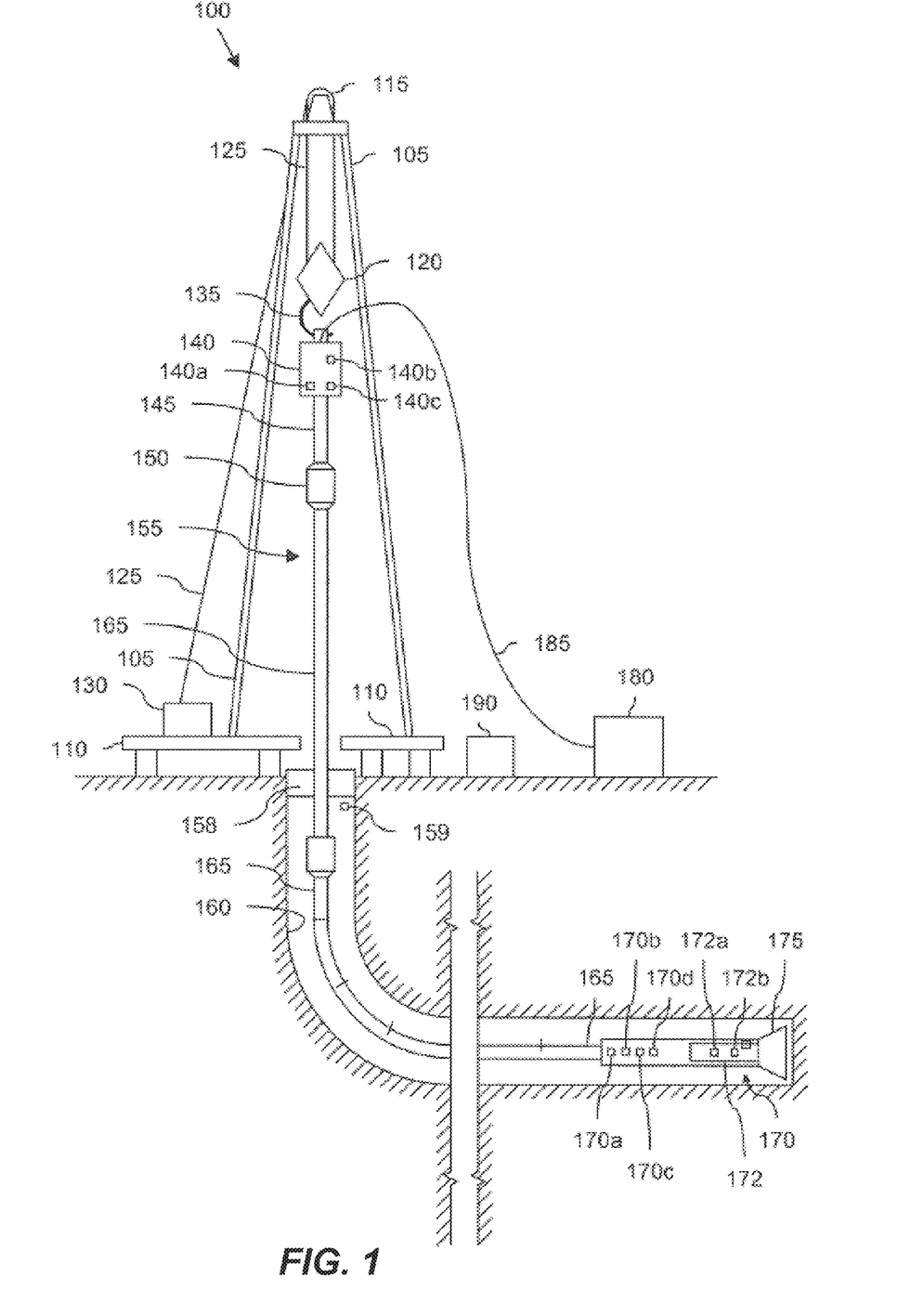
FIG. 1 is a schematic diagram of a drilling rig apparatus including a bottom hole assembly (BHA), according to one or more aspects of the present disclosure.

Referring to FIG. 1, illustrated is a schematic view of apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to drawworks 130, which is configured to reel out and reel in the drilling line 125 to cause the traveling block 120 to be lowered and raised relative to the rig floor 110. The drawworks 130 may include a rate of penetration ("ROP") sensor 130a, which is configured for detecting an ROP value or range, and a controller to feed-out and/or feed-in of a drilling line 125. The other end of the drilling line 125, known as a dead line anchor, is anchored to a fixed position, possibly near the drawworks 130 or elsewhere on the rig.

A hook 135 is attached to the bottom of the traveling block 120. A top drive 140 is suspended from the hook 135. A quill 145, extending from the top drive 140, is attached to a saver sub 150, which is attached to a drill string 155 suspended within a wellbore 160. Alternatively, the quill 145 may be attached to the drill string 155 directly.

The term "quill" as used herein is not limited to a component which directly extends from the top drive, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, albeit merely for the sake of clarity and conciseness, these components may be collectively referred to herein as the "quill."

The drill string 155 includes interconnected sections of drill pipe 165, a bottom hole assembly (BHA) 170, and a drill bit 175. The BHA 170 may include one or more motors 172, stabilizers, drill collars, and/or measurement-while-drilling ("MWD") or wireline conveyed instruments, among other components. The drill bit 175, which may also be referred to herein as a tool, is connected to the bottom of the BHA 170, forms a portion of the BHA 170, or is otherwise attached to the drill string 155. One or more pumps 180 may deliver drilling fluid to the drill string 155 through a hose or other conduit 185, which may be connected to the top drive 140.

The downhole MWD or wireline conveyed instruments may be configured for the evaluation of physical properties such as pressure, temperature, torque, weight-on-bit ("WOB"), vibration, inclination, azimuth, toolface orientation in three-dimensional space, and/or other downhole parameters. These measurements may be made downhole, stored in solid-state memory for some time, and downloaded from the instrument(s) at the surface and/or transmitted real-time to the surface. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, and/or transmission as electromagnetic pulses. The MWD tools and/or other portions of the BHA 170 may have the ability to store measurements for later retrieval via wireline and/or when the BHA 170 is tripped out of the wellbore 160.

In an example embodiment, the apparatus 100 may also include a rotating blow-out preventer ("BOP") 186, such as if the wellbore 160 is being drilled utilizing under-balanced or managed-pressure drilling methods. In such embodiment, the annulus mud and cuttings may be pressurized at the surface, with the actual desired flow and pressure possibly being controlled by a choke system, and the fluid and pressure being retained at the well head and directed down the flow line to the choke by the rotating BOP 186. The apparatus 100 may also include a surface casing annular pressure sensor 187 configured to detect the pressure in the annulus defined between, for example, the wellbore 160 (or casing therein) and the drill string 155. It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data.

In the example embodiment depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 may include a downhole annular pressure sensor 170a coupled to or otherwise associated with the BHA 170. The downhole annular pressure sensor 170a may be configured to detect a pressure value or range in the annulus-shaped region defined between the external surface of the BHA 170 and the internal diameter of the wellbore 160, which may also be referred to as the casing pressure, downhole casing pressure, MWD casing pressure, or downhole annular pressure. These measurements may include both static annular pressure (pumps off) and active annular pressure (pumps on).

The apparatus 100 may additionally or alternatively include a shock/vibration sensor 170b that is configured for detecting shock and/or vibration in the BHA 170. The apparatus 100 may additionally or alternatively include a mud motor delta pressure (ΔP) sensor 172a that is configured to detect a pressure differential value or range across the one or more motors 172 of the BHA 170. In some embodiments, the mud motor ΔP may be alternatively or additionally calculated, detected, or otherwise determined at the surface, such as by calculating the difference between the surface standpipe pressure just off-bottom and pressure once the bit touches bottom and starts drilling and experiencing torque. The one or more motors 172 may each be or include a positive displacement drilling motor that uses hydraulic power of the drilling fluid to drive the bit 175, also known as a mud motor. One or more torque sensors, such as a bit torque sensor 172b, may also be included in the BHA 170 for sending data to a controller 190 that is indicative of the torque applied to the bit 175 by the one or more motors 172.

The apparatus 100 may additionally or alternatively include a toolface sensor 170c configured to estimate or detect the current toolface orientation or toolface angle. For the purpose of slide drilling, bent housing drilling systems are typically used and may include motor 172 with a bent housing or other bend component operable to create an off-center departure of the bit 175 from the center line of the wellbore 160. The direction of this departure from the centerline in a plane normal to the centerline is referred to as the "toolface angle." The toolface sensor 170c may be or include a conventional or future-developed gravity toolface sensor, which detects toolface orientation relative to the Earth's gravitational field. Alternatively, or additionally, the toolface sensor 170c may be, or include, a conventional or future-developed magnetic toolface sensor which detects toolface orientation relative to magnetic north or true north. In an example embodiment, a magnetic toolface sensor may detect the current toolface when the end of the wellbore is less than about 7° from vertical, and a gravity toolface sensor may detect the current toolface when the end of the wellbore is greater than about 7° from vertical. However, other toolface sensors may also be utilized within the scope of the present disclosure, including non-magnetic toolface sensors and non-gravitational inclination sensors. The toolface sensor 170c may also, or alternatively, be or include a conventional or future-developed gyro sensor. The apparatus 100 may additionally or alternatively include a WOB sensor 170d integral to the BHA 170 and configured to detect WOB at or near the BHA 170. The apparatus 100 may additionally or alternatively include an inclination sensor 170e integral to the BHA 170 and configured to detect inclination at or near the BHA 170. The apparatus 100 may additionally or alternatively include an azimuth sensor 170f integral to the BHA 170 and configured to detect azimuth at or near the BHA 170. The apparatus 100 may additionally or alternatively include a torque sensor 140a coupled to or otherwise associated with the top drive 140. The torque sensor 140a may alternatively be located in or associated with the BHA 170. The torque sensor 140a may be configured to detect a value or range of the torsion of the quill 145 and/or the drill string 155 (e.g., in response to operational forces acting on the drill string). The top drive 140 may additionally or alternatively include or otherwise be associated with a speed sensor 140b configured to detect a value or range of the rotational speed of the quill 145.

The top drive 140, the drawworks 130, the crown block 115, the traveling block 120, drilling line or dead line anchor may additionally or alternatively include or otherwise be associated with a WOB or hook load sensor 140c (WOB calculated from the hook load sensor that can be based on active and static hook load) (e.g., one or more sensors installed somewhere in the load path mechanisms to detect and calculate WOB, which can vary from rig-to-rig) different from the WOB sensor 170d. The WOB sensor 140c may be configured to detect a WOB value or range, where such detection may be performed at the top drive 140, the drawworks 130, or other component of the apparatus 100. Generally, the hook load sensor 140c detects the load on the hook 135 as it suspends the top drive 140 and the drill string 155.

The detection performed by the sensors described herein may be performed once, continuously, periodically, and/or at random intervals. The detection may be manually triggered by an operator or other person accessing a human-machine interface ("HMI") or GUI, or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces, which may be local at the well/rig site or located at another, remote location with a network link to the system.

The apparatus 100 also includes the controller 190 configured to control or assist in the control of one or more components of the apparatus 100. For example, the controller 190 may be configured to transmit operational control signals to the drawworks 130, the top drive 140, the BHA 170 and/or the pump 180. The controller 190 may be a stand-alone component installed near the mast 105 and/or other components of the apparatus 100. In an example embodiment, the controller 190 includes one or more systems located in a control room proximate the mast 105, such as the general purpose shelter often referred to as the "doghouse" serving as a combination tool shed, office, communications center, and general meeting place. The controller 190 may be configured to transmit the operational control signals to the drawworks 130, the top drive 140, the BHA 170, and/or the pump 180 via wired or wireless transmission means which, for the sake of clarity, are not depicted in FIG. 1.

Figure 2:
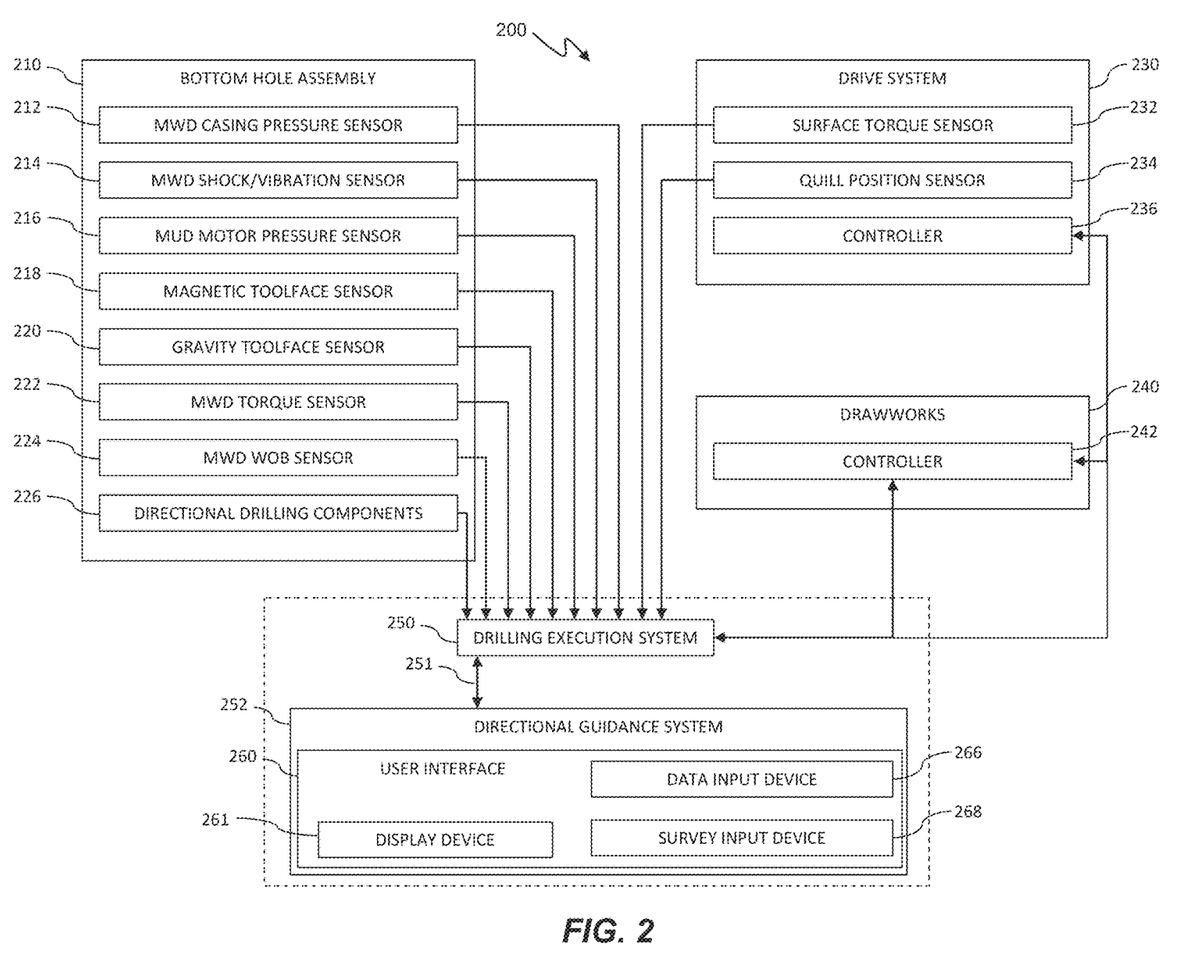
FIG. 2 is a schematic diagram of a portion of the drilling rig apparatus of FIG. 1 including a drilling execution system and a directional guidance system, according to one or more aspects of the present disclosure.

Referring to FIG. 2, illustrated is a block diagram of an apparatus 200 according to one or more aspects of the present disclosure. The apparatus 200 may include a drilling execution system 250, a directional guidance system 252, a bottom hole assembly (BHA) 210, a drive system 230, and a drawworks 240. The apparatus 200 may be implemented within the environment and/or apparatus shown in FIG. 1. For example, the BHA 210 may be substantially similar to or may be the BHA 170 shown in FIG. 1, the drive system 230 may be substantially similar to the top drive 140 shown in FIG. 1, the drawworks 240 may be substantially similar to the drawworks 130 shown in FIG. 1, and the drilling execution system 250 may be substantially similar to the controller 190 shown in FIG. 1.

The directional guidance system 252 may include components such as a user interface 260, a data input device 266, a survey input device 268, and a display device. The drilling execution system 250 and the directional guidance system 252 may be discrete components that are interconnected via wired or wireless devices. Alternatively, the drilling execution system 250 and the directional guidance system 252 may be integral components of a single system or controller 190, as indicated by the dashed lines in FIG. 2. In some implementations, the directional guidance system 252 and drilling execution system 250 are automated systems and slide drilling execution and the provision of directional instructions is enhanced through bi-directional communication between the systems.

The user interface 260 may include a data input device 266 that permits a user to input one or more toolface set points or other data directing the orientation of the BHA. This may also include inputting other set points, limits, and other input data. The data input device 266 may include a keypad, voice-recognition apparatus, dial, button, switch, slide selector, toggle, joystick, mouse, data base and/or other conventional or future-developed data input device. This data input device 266 may support data input from local and/or remote locations. Alternatively, or additionally, the data input device 266 may include one or more devices for providing a user selection of predetermined toolface set point values or ranges, such as via one or more drop-down menus or allows a user to enter desired setpoint values or ranges. The toolface set point data may also or alternatively be selected by the directional guidance system 252 via the execution of one or more database look-up procedures. In general, the data input device 266 and/or other components within the scope of the present disclosure support operation and/or monitoring from stations on the rig site as well as one or more remote locations with a communications link to the system, network, local area network (LAN), wide area network (WAN), Internet, satellite-link, and/or radio, among other communication types.

The user interface 260 may also include a survey input device 268. The survey input device 268 may include information gathered from sensors regarding the orientation and location of the BHA 210. In some implementations, survey input device 268 is automatically entered into the user interface at regular intervals.

The user interface 260 may also include a display device 261 arranged to present visualizations of a down hole environment, such as a two-dimensional visualization and/or a three-dimensional visualization. The display device 261 may be used for visually presenting information to the user in textual, graphic, or video form. Depending on the implementation, the display device 261 may include, for example, an LED or LCD display computer monitor, touchscreen display, television display, a projector, or other display device. This display device may be configured to display communications and signals sent between the directional guidance system 252 and the drilling execution system 250.

The directional guidance system 252 and the drilling execution system 250 may communicate with bi-directional communication 251 via wired or wireless transmission. In some implementations, this communication is continuous, such that signals are sent between the directional guidance system 252 and the drilling execution system 250 simultaneously during a drilling operation. In some implementations, the signals include feedback from sensors on the drilling system that prompt changes to parameters of the directional guidance system 252 and the drilling execution system 250. Examples of information communicated between the directional guidance system 252 and drilling execution system 250 include a current slide score (as discussed in more detail below) as a measure of the quality of the slide, a toolface distribution to target (e.g., percentage of toolface values within X degrees of the advisory toolface angle), resultant slide vector (e.g., the aggregate toolface direction of all toolface measurements throughout a single slide), current slide distance, remaining slide distance, bit proximity to steering line or steering window, average and current rate of penetration, qualitative information that describes the adherence of the as-drilled trajectory to the planned trajectory or input steering line, real-time information about the actual current inclination and azimuth of the bottomhole assembly, as measured at the MWD survey package, and real-time information about the projected current inclination and azimuth of the bit, as well as other types of sensor data and feedback from various drilling systems. These communications may be used to change parameters of both the drilling execution system 250 and directional guidance system 252. In a first example, if the quality of a slide is determined to be poor (measured by slide score or toolface distribution to target), slide instructions for directing the BHA may be revised by the directional guidance system 252 to extend the current slide or future slides further to achieve the directional objective. In a second example, if the quality of previously conducted slides is determined to be decreasing, future instructions may be modified to call for longer slides under the assumption that average motor yields (e.g., a parameter of the drilling execution system 250) are decreasing. In some implementations, the parameters of the drilling execution system and directional guidance system 25 may be changed during a slide operation in response to communicated information. Communications between the systems 250, 252 may be sent automatically or manually by a drill operator.

The BHA 210 may include a MWD casing pressure sensor 212 that is configured to detect an annular pressure value or range at or near the MWD portion of the BHA 210, and that may be substantially similar to the down hole annular pressure sensor 170a shown in FIG. 1. The casing pressure data detected via the MWD casing pressure sensor 212 may be sent via electronic signal to the drilling execution system 250 via wired or wireless transmission.

The BHA 210 may also include an MWD shock/vibration sensor 214 that is configured to detect shock and/or vibration in the MWD portion of the BHA 210, and that may be substantially similar to the shock/vibration sensor 170b shown in FIG. 1. The shock/vibration data detected via the MWD shock/vibration sensor 214 may be sent via electronic signal to the drilling execution system 250 via wired or wireless transmission.

The BHA 210 may also include a mud motor pressure sensor 216 that is configured to detect a pressure differential value or range across the mud motor of the BHA 210, and that may be substantially similar to the mud motor pressure sensor 172a shown in FIG. 1. The pressure differential data detected via the mud motor pressure sensor 216 may be sent via electronic signal to the drilling execution system 250 via wired or wireless transmission. The mud motor pressure may be alternatively or additionally calculated, detected, or otherwise determined at the surface, such as by calculating the difference between the surface standpipe pressure just off-bottom and pressure once the bit touches bottom and starts drilling and experiencing torque.

The BHA 210 may also include a magnetic toolface sensor 218 and a gravity toolface sensor 220 that are cooperatively configured to detect the current toolface, and that collectively may be substantially similar to the toolface sensor 170c shown in FIG. 1. The magnetic toolface sensor 218 may be or include a conventional or future-developed magnetic toolface sensor which detects toolface orientation relative to magnetic north. The gravity toolface sensor 220 may be or include a conventional or future-developed gravity toolface sensor which detects toolface orientation relative to the Earth's gravitational field. In an exemplary implementation, the magnetic toolface sensor 218 may detect the current toolface when the end of the wellbore is less than about 7° from vertical, and the gravity toolface sensor 220 may detect the current toolface when the end of the wellbore is greater than about 7° from vertical. However, other toolface sensors may also be utilized within the scope of the present disclosure, including non-magnetic toolface sensors and non-gravitational inclination sensors. In any case, the toolface orientation detected via the one or more toolface sensors (e.g., magnetic toolface sensor 218 and/or gravity toolface sensor 220) may be sent via electronic signal to the drilling execution system 250 via wired or wireless transmission.

The BHA 210 may also include an MWD torque sensor 222 that is configured to detect a value or range of values for torque applied to the bit by the motor(s) of the BHA 210, and that may be substantially similar to the torque sensor 172b shown in FIG. 1. The torque data detected via the MWD torque sensor 222 may be sent via electronic signal to the drilling execution system 250 via wired or wireless transmission.

The BHA 210 may also include a MWD WOB sensor 224 that is configured to detect a value or range of values for WOB at or near the BHA 210, and that may be substantially similar to the WOB sensor 170d shown in FIG. 1. The WOB data detected via the MWD WOB sensor 224 may be sent via electronic signal to the drilling execution system 250 via wired or wireless transmission.

Depending upon the implementation, the BHA 210 may include one or more directional drilling components 226. These components may include bent housing system components. In some implementations, the directional drilling components 226 may include a drilling motor that forms part of the BHA 210.

The drawworks 240 may include a controller 242 and/or other devices for controlling feed-out and/or feed-in of a drilling line (such as the drilling line 125 shown in FIG. 1). Such control may include rotary control of the drawworks (in versus out) to control the height or position of the hook, and may also include control of the rate the hook ascends or descends.

The drive system 230 typically includes the top drive 140 and may include a surface torque sensor 232 that is configured to detect a value or range of the reactive torsion of the quill or drill string, much the same as the torque sensor 140a shown in FIG. 1. The drive system 230 also includes a quill position sensor 234 that is configured to detect a value or range of the rotary position of the quill, such as relative to true north or another stationary reference. The surface torsion and quill position data detected via the surface torque sensor 232 and the quill position sensor 234, respectively, may be sent via electronic signal to the drilling execution system 250 via wired or wireless transmission. The drive system 230 also includes a controller 236 and/or other devices for controlling the rotary position, speed and direction of the quill or other drill string component coupled to the drive system 230 (such as the quill 145 shown in FIG. 1).

The drilling execution system 250 may be configured to receive one or more of the above-described parameters from the user interface 260, the BHA 210, the drawworks 240, and/or the drive system 230, and utilize such parameters to continuously, periodically, or otherwise determine the current toolface orientation. The drilling execution system 250 may be further configured to generate a control signal, such as via intelligent adaptive control, and provide the control signal to the drive system 230 and/or the drawworks 240 to adjust and/or maintain the toolface orientation. For example, the drilling execution system 250 may provide one or more signals to the drive system 230 and/or the drawworks 240 to increase or decrease WOB and/or quill position, such as may be required to accurately "steer" the drilling operation.

Figure 3:
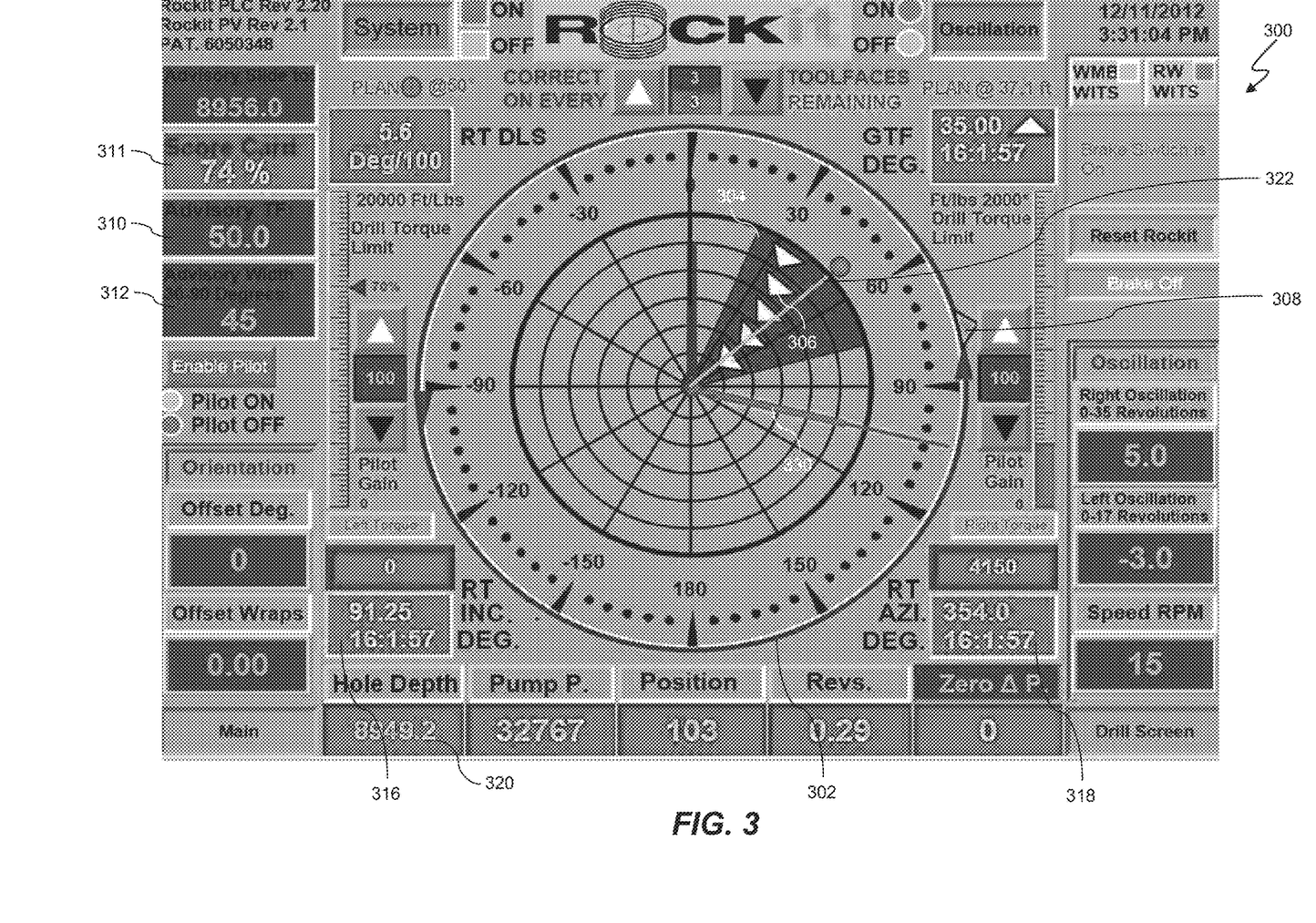
FIG. 3 is a schematic diagram of an exemplary display apparatus showing a two-dimensional visualization, according to one or more aspects of the present disclosure.

FIG. 3 shows a schematic view of a human-machine interface (HMI) 300 according to one or more aspects of the present disclosure. The HMI 300 may be utilized by a human operator during directional and/or other drilling operations to monitor the relationship between toolface orientation and quill position. The HMI 300 may include aspects of the ROCKit® HMI display of Canrig Drilling Technology, LTD. In an exemplary implementation, the HMI 300 is one of several display screens selectably viewable by the user during drilling operations, and may be included as or within the human-machine interfaces, drilling operations and/or drilling apparatus described in the systems herein. The HMI 300 may also be implemented as a series of instructions recorded on a computer-readable medium, such as described in one or more of these references. In some implementations, the HMI 300 is the display device 261 of FIG. 2.

The HMI 300 may be accessed by a user, who may be a directional driller operator, while drilling to monitor the status and direction of drilling using the BHA. The directional guidance system 252 of FIG. 2 may drive one or more other human-machine interfaces during drilling operation and may be configured to also display the HMI 300 on the display device 261. The directional guidance system 252 driving the HMI 300 may include a "survey" or other data channel, or otherwise includes devices for receiving and/or reading sensor data relayed from the BHA 170, a measurement-while-drilling (MWD) assembly, a RSS assembly, and/or other drilling parameter measurement devices, where such relay may be via the Wellsite Information Transfer Standard (WITS), WITS Markup Language (WITS ML), and/or another data transfer protocol. Such electronic data may include gravity-based toolface orientation data, magnetic-based toolface orientation data, azimuth toolface orientation data, and/or inclination toolface orientation data, among others.

As shown in FIG. 3, the HMI 300 may be depicted as substantially resembling a dial or target shape 302 having a plurality of concentric nested rings. The HMI 300 also includes a pointer 330 representing the quill position. Symbols for magnetic toolface data and gravity toolface data symbols may also be shown. In the example of FIG. 3, gravity toolface angles are depicted as toolface symbols 306. In one exemplary implementation, the symbols for the magnetic toolface data are shown as circles and the symbols for the gravity toolface data are shown as rectangles. Of course, other shapes may be utilized within the scope of the present disclosure. The toolface symbols 306 may also or alternatively be distinguished from one another via color, size, flashing, flashing rate, and/or other graphic elements.

In some implementations, the toolface symbols 306 may indicate only the most recent toolface measurements. However, as in the exemplary implementation shown in FIG. 3, the HMI 300 may include a historical representation of the toolface measurements, such that the most recent measurement and a plurality of immediately prior measurements are displayed. Thus, for example, each ring in the HMI 300 may represent a measurement iteration or count, or a predetermined time interval, or otherwise indicate the historical relation between the most recent measurement(s) and prior measurement(s). In the exemplary implementation shown in FIG. 3, there are five such rings in the dial 302 (the outermost ring being reserved for other data indicia), with each ring representing a data measurement or relay iteration or count. The toolface symbols 306 may each include a number indicating the relative age of each measurement. In the present example, the outermost triangle of the toolface symbols 306 corresponds to the most recent measurement. After the most recent measurement, previous measurements are positioned incrementally towards the center of the dial 302. In other implementations, color, shape, and/or other indicia may graphically depict the relative age of measurement. Although not depicted as such in FIG. 3, this concept may also be employed to historically depict the quill position data. In some implementations, measurements are taken every 10 seconds, although depending on the implementation, measurements may be taken at time periods ranging from every second to every half-hour. Other time periods are also contemplated.

The HMI 300 may also include a number of textual and/or other types of indicators 316, 318, 320 displaying parameters of the current or most recent toolface orientation. For example, indicator 316 shows the inclination of the wellbore, measured by the survey instrument, as 91.25°. Indicator 318 shows the azimuth of the wellbore, measured by the survey instrument as 354°. Indicator 320 shows the hole depth of the wellbore as 8949.2 feet. In the exemplary implementation shown, the HMI 300 may include a programmable advisory width. In the example of FIG. 3, this value is depicted by advisory width sector 304 with an adjustable angular width corresponding to an angular setting shown in the corresponding indicator 312, in this case 45°. The advisory width is a visual indicator providing the user with a range of acceptable deviation from the advisory toolface direction. In the example of FIG. 3, the toolface symbols 306 all lie within the advisory width sector 304, meaning that the user is operating within acceptable deviation limits from the advisory toolface direction. Indicator 310 gives an advisory toolface direction, corresponding to line 322. The advisory toolface direction represents an optimal direction towards the drill plan. Indicator 308, shown in FIG. 3 as an arrow on the outermost edge of the dial 302, is an indicator of the overall resultant direction of travel of the toolface. This indicator 308 may present an orientation that averages the values of other indicators 316, 318, 320. Other values and depictions are included on the HMI 300 that are not discussed herein. These other values include the time and date of drilling, aspects relating to the operation of the drill, and other received sensor data.

In some implementations, the HMI 300 is configured to display a drilling score 311, such as a slide stability score. The calculation of a slide score is discussed in detail in co-pending U.S. patent application Ser. No. 16/157,709, filed Oct. 11, 2018 entitled "Devices, Systems and Methods to Calculate Slide Stability," the entirety of which is incorporated herein by express reference thereto. The slide stability score may give a measurement of the consistency of toolface angles during one or more slides.

In some implementations, the HMI 300 may include information communicated between the drilling execution system 250 and the directional guidance system 252. This information, including measurements from sensors, drilling instructions, slide score, location and orientation of the BHA, and other data may be displayed by the HMI 300 in a graphical or numeric format. The drilling operation may direct the drilling operation using this information as a reference.

Figure 4A:
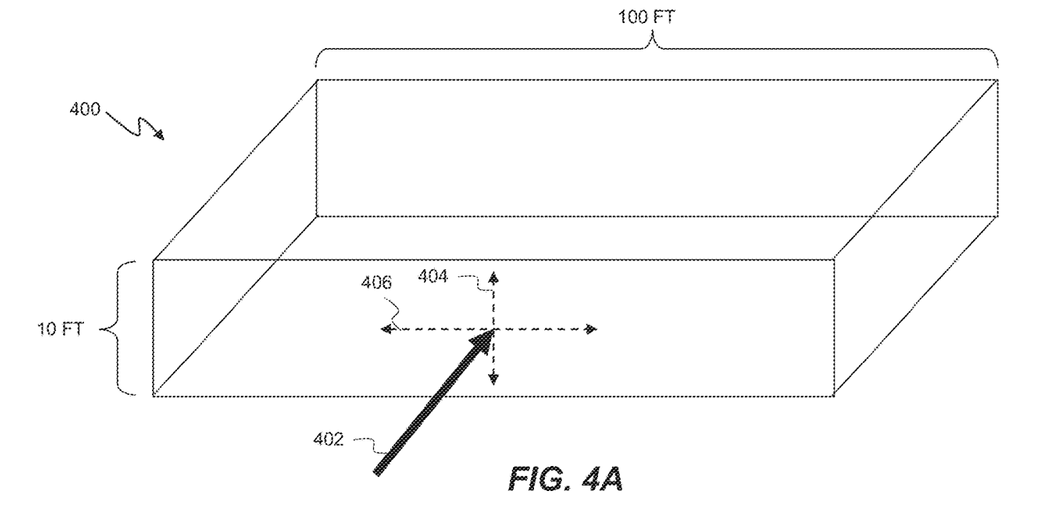
FIGS. 4A, 4B, and 4C illustrate criticality as related to a directional target, according to one or more aspects of the present disclosure.
Figure 4B:
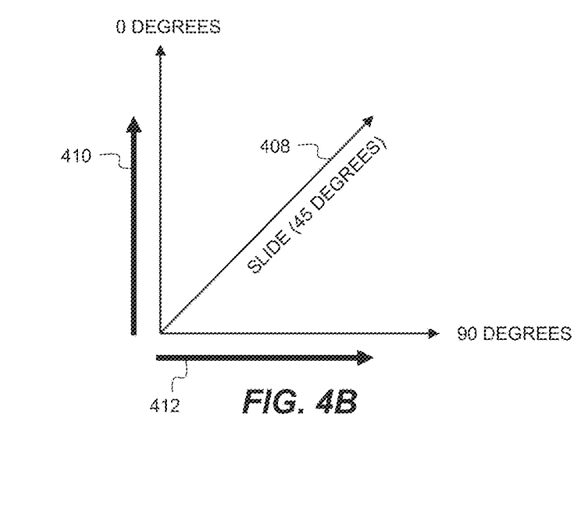
Figure 4C:
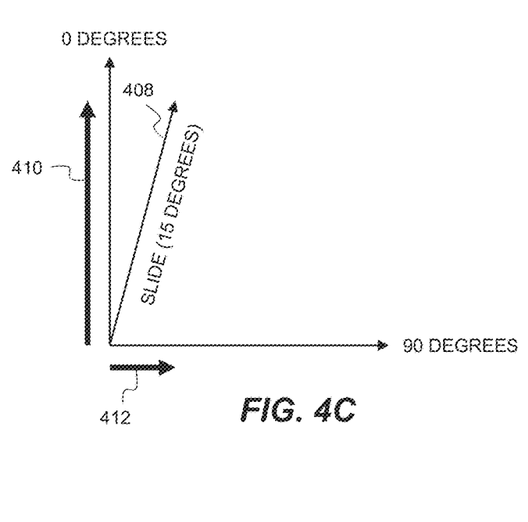

In some implementations, parameters of the drilling instructions and execution of a slide drilling operation may be varied based on the criticality of directional control, as shown in the diagrammatic illustrations of FIGS. 4A-4C. FIG. 4A shows the approach of a BHA 402 to a directional target 400 (e.g., within an underground formation), with criticality in the vertical direction (inclination) represented by the vertical arrow 404 and criticality in horizontal direction (azimuth) represented by the horizontal arrow 406. In the example of FIG. 4A, the acceptable horizontal tolerance (100 ft) of the directional target 400 is much larger than the acceptable vertical tolerance (10 ft). Because of this, the horizontal criticality 406 in this example is less than the vertical criticality 404. This difference in criticality may be taken in account during a slide drilling operation. In particular, the directional guidance system 252 may change drilling instructions to prioritize performance (e.g., slide drilling speed) over precision (e.g., drilling accuracy) based on a difference in criticality. In a first example, when computing directional instructions, the directional guidance system 252 may try to keep the BHA within the target 400 for a slide with a 45-degree angle in FIG. 4B. For this slide, a resultant vector in the vertical direction 410 is equal to the resultant vector in the horizontal direction 412, meaning that no preference for precision over performance (or vice versa) is included in the instructions. However, in a second example, for a slide with a 15-degree angle in FIG. 4C, a resultant vector in the vertical direction 410 is greater than the resultant vector in the horizontal direction 412. For this slide, the directional guidance system 252 may generate drilling instructions to prioritize precision over performance, since the slide has greater criticality in the vertical direction. Similarly, for a slide angle of greater than 45 degrees to the right (or less than −45 degrees to the left) gravity toolface (GTF), the directional guidance system 252 may generate drilling instructions to prioritize performance over precision.

In other implementations, criticality of other parameters may be taken into account when calculating or adjusting drilling instructions. For example, the directional guidance system 252 may take into account the criticality of the actual wellbore proximity to the drill plan. In particular, if a section of the drill plan has a high criticality of the actual wellbore proximity to the drill plan, the directional guidance system 252 may prioritize precision over performance for this section. The directional guidance system 252 may then communicate this criticality to the drilling execution system 250 whether to prioritize speed or precision, and the behavior of the drilling execution system 250 would change based on this. In some implementations, the drilling execution system 250 is configured to operate under different sets of parameters based on criticality, such as acceptable tolerance in a particular direction (i.e., vertical or horizontal), rate of penetration, and other parameters. In some implementations, the drilling instructions may also be modified to reflect this priority. Other sections may not have a high criticality of this proximity, and the drilling instructions for those sections may prioritize performance over precision.

Figure 5:
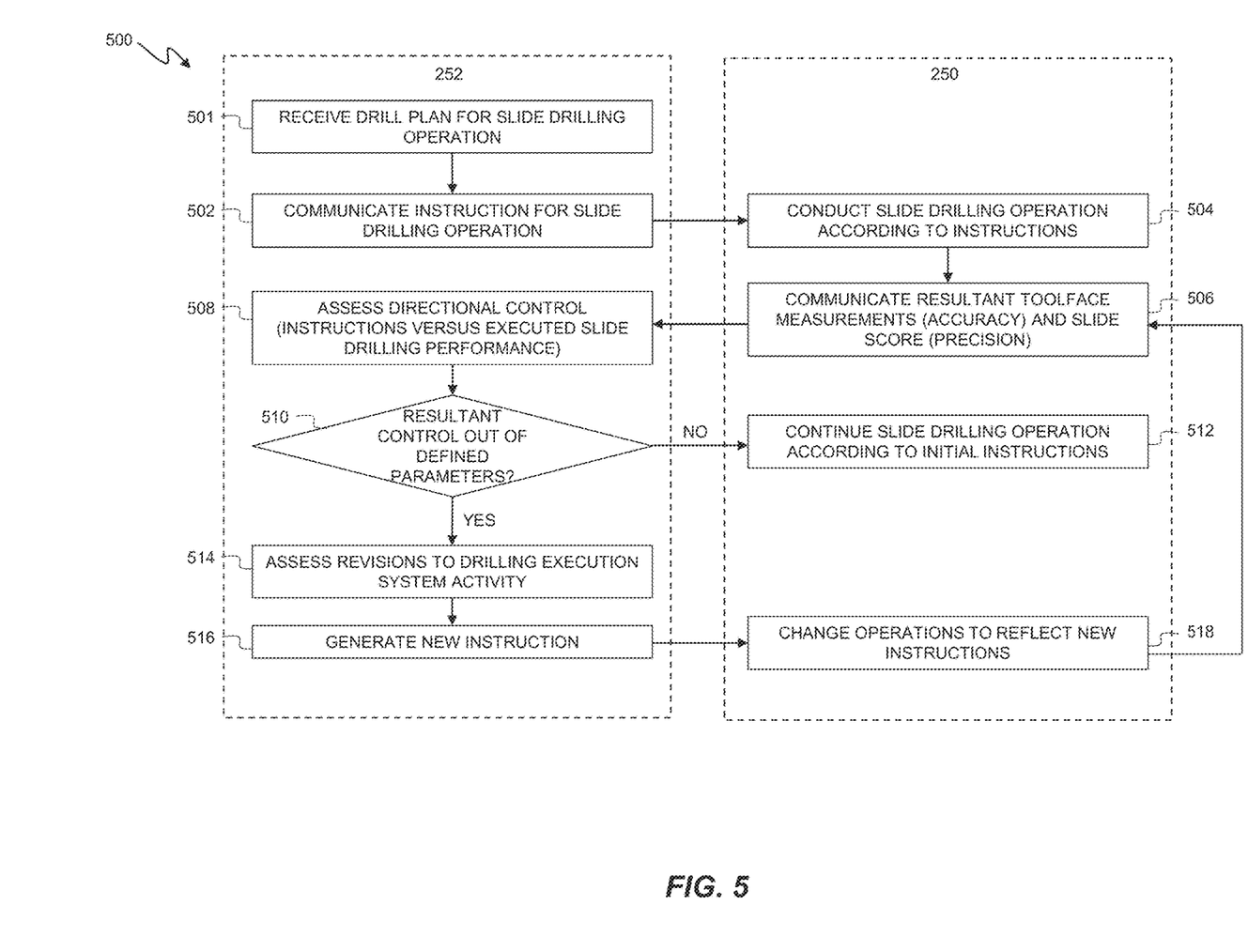
FIG. 5 is a flowchart diagram of a method of directing operation of a drilling system with bi-directional communication, according to one or more aspects of the present disclosure.

FIG. 5 is a flow chart showing an exemplary method 500 of conducting a slide drilling operation. It is understood that additional steps can be provided before, during, and after the steps of method 500, and that some of the steps described can be replaced or eliminated for other implementations of the method 500. In particular, the directional guidance system 252 and drilling execution system 250 shown in FIG. 2 may be used to carry out various steps of the method 500, as indicated by steps inside the dotted lines referencing the directional guidance system 252 and drilling execution system 250, respectively.

At step 501, the method 500 may include receiving a drill plan for a slide drilling operation with the directional guidance system 252. This may be accomplished by entering location and orientation coordinates into a controller of a drilling system such as the directional guidance system 252 discussed with reference to FIG. 2. The drill plan may also be entered via the user interface, and/or downloaded or transferred to the directional guidance system 252. The directional guidance system 252 may therefore receive the drill plan directly from the user interface or a network or disk transfer or from some other location. In some implementations, the drill plan includes one or more slide drilling operations with at least one planned toolface angle.

At step 502, the method 500 may include communicating one or more instructions for a slide drilling operation from the directional guidance system 252 to the drilling execution system 250. These instructions may include a distance and direction of the slide, for example, 10 feet at 45 degrees gravity toolface (GTF). The drilling instructions may include one or more performance parameters, such as drilling tolerances, rate of penetration, criticality of actual wellbore proximity to the drill plan, criticality of wellbore inclination versus azimuth, optimization of slide footage (e.g., minimization of footage while meeting drill plan objectives and considering rate of penetration), and other parameters. This step may include receiving acceptable parameter thresholds, which may be received by the directional guidance system 252 from an input device. These thresholds may be included in the drill plan, and may take into account previous drilling operations.

At step 504, the method 500 may include conducting a slide drilling operation with the drilling execution system 250 according to the instructions received from the directional guidance system 252. This step may include adjusting the drill string using the top drive to rotate the bent motor of the BHA of the directional drilling system to the planned toolface angle. When the actual toolface angle corresponds to the planned toolface angle, then the drilling execution system 250 may begin the sliding operation.

At step 506, the method 500 may include communicating a resultant toolface measurements (representing accuracy) and a slide score (representing precision) from the drilling execution system 250 to the directional guidance system 252. For example, the drilling execution system 250 may compute that the resultant slide vector is 0 degrees GTF with a high slide score and communicate this information to the directional guidance system 252. In some implementations, these measurements are continuously communicated by the drilling execution system 250 during the slide drilling operation.

At step 508, the method 500 may include assessing the directional control with the directional guidance system 252. In some implementations, this assessment may include comparing a hypothetical drilling operation following the instructed drilling steps and the executed slide drilling performance.

At step 510, the method 500 may include determining if the resultant directional control is outside defined parameters with the directional guidance system 252. These parameters may be those discussed in relation to step 502. If the directional guidance system 252 determines that the directional control is within the parameters, the method 500 may continue to step 512 where the drilling execution system 250 continues slide drilling operation according to the initial instructions communicated in step 520. If the directional guidance system 252 determines that the directional control is outside established parameters, the method 500 may continue to step 514 where the directional guidance system 252 assesses revisions to the activity of the drilling execution system 250. In some implementations, this assessment is continually performed by the directional guidance system 252 during the drilling operation. For example, if the resultant slide vector in step 506 is measured to be 0 degrees GTF with a high slide score, the directional guidance system 252 may determine that the slide vector is outside drilling tolerances. The assessment of step 514 may include considering: optimization data of the slide footage (e.g., minimizing distance to slide while meeting objectives of the drill plan), and in particular, considering the rate of penetration; the criticality of the actual drilled wellbore to the drill plan; and the criticality of wellbore inclination versus azimuth as discussed in reference to FIGS. 4A-4C, as well as other data from the drilling execution system 250.

At step 516, the method 500 may include generating revised or new instructions with the directional guidance system 252 to direct the drilling execution system 250. These instructions may include stopping the slide, revising the slide direction, revising the slide distance, and revising both the slide direction and the slide distance. For example, if the resultant slide vector in step 506 is measured to be 0 degrees GTF with a high slide score and the directional guidance system 252 determines that the slide vector is outside drilling tolerances, the new instruction may call for a change in slide direction. If the resultant slide vector is completely in the wrong direction, the new instructions may instruct the drilling execution system 250 to stop the current slide and start a new slide drilling operation in the right direction. In the case that the resultant slide vector in step 506 is measured to be 45 degrees GTF with a low slide score, the new instructions may revise the target toolface based on the relative importance of inclination control versus azimuth control. Because the quality of the slide is low, for the remainder of the slide it may become more important to achieve directional control of borehole inclination or azimuth. The revised target toolface would be biased to achieve the more critical directional objective.

At step 518, the method 500 may include changing the slide drilling operation with the drilling execution system 250 to reflect the new instructions. After step 518, the method 500 may proceed to step 408 and the drilling execution system 250 may continue to communicate drilling data to the directional guidance system 252.

Figure 6:
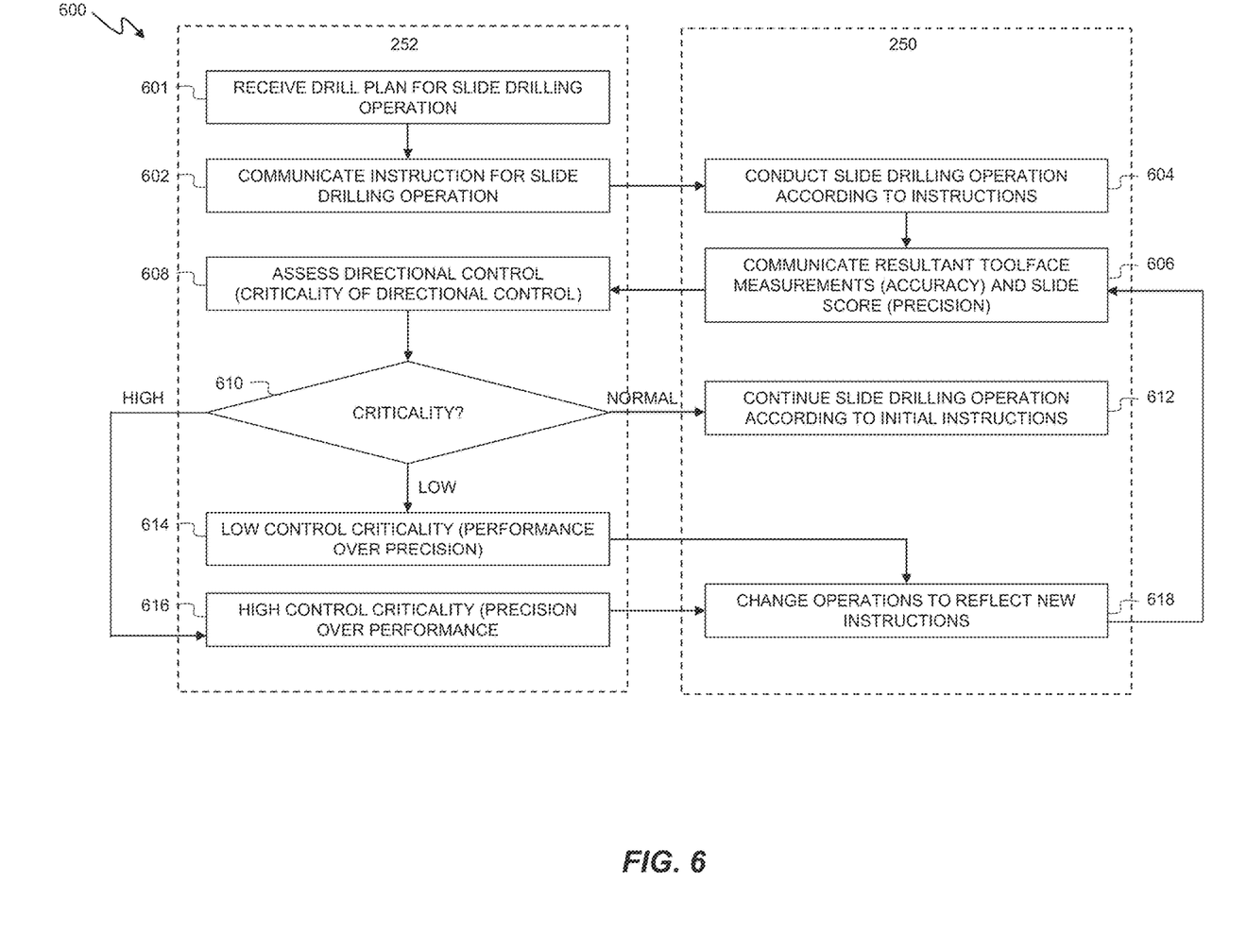
FIG. 6 is another flowchart diagram of a method of directing operation of a drilling system with bi-directional communication, according to one or more aspects of the present disclosure.

FIG. 6 is a flow chart showing an exemplary method 600 of conducting a slide drilling operation. It is understood that additional steps can be provided before, during, and after the steps of method 600, and that some of the steps described can be replaced or eliminated for other implementations of the method 600. Similar to method 500, the directional guidance system 252 and drilling execution system 250 shown in FIG. 2 may be used to carry out various steps of the method 600.

At step 601, the method 600 may include receiving a drill plan for a slide drilling operation with the directional guidance system 252, similar to step 501 of method 500.

At step 602, the method 600 may include communicating one or more instructions for a slide drilling operation from the directional guidance system 252 to the drilling execution system 250, similar to step 502 of method 500. These instructions may include a distance and direction of the slide, for example, 10 feet at 45 degrees gravity toolface (GTF). The drilling instructions may include one or more performance parameters, such as drilling tolerances, rate of penetration, criticality of actual wellbore proximity to the drill plan, criticality of wellbore inclination versus azimuth, and other parameters.

At step 604, the method 600 may include conducting a slide drilling operation with the drilling execution system 250 according to the instructions received from the directional guidance system 252, similar to step 504 of method 500.

At step 606, the method 600 may include communicating a resultant toolface measurements (representing accuracy) and a slide score (representing precision) from the drilling execution system 250 to the directional guidance system 252, similar to step 506 of method 500.

At step 608, the method 500 may include assessing the directional control with the directional guidance system 252. In some implementations, this assessment may include assessing the criticality of directional control.

At step 610, the method 600 may include determining a level of criticality of the directional control. For example, if directional control criticality is determined to be normal, the method 600 may continue to step 612 where the drilling execution system 250 continues the slide drilling operation according to the initial instructions. If directional control criticality is determined to be low, the methodology of the drilling execution system 250 may be revised to prioritize rate of penetration over directional control in step 614. The method 600 then would continue to step 618 where the drilling execution system 250 would change operations to reflect the new instructions.

If directional control criticality is determined to be high, the methodology of the drilling execution system 250 may be revised to prioritize directional control over rate of penetration in step 616. The method 600 then would continue to step 618 where the drilling execution system 250 would change operations to reflect the new instructions.

If directional control criticality of either inclination or azimuth is more important, the slide execution system control methodology may be revised to prioritize control of either inclination or azimuth to change operations in step 618. For example, if inclination control becomes more critical while drilling in the lateral, the drilling execution system 250 may attempt to maintain tighter toolface control while sliding up or down, and allow more toolface variance if sliding left or right (because horizontal tolerance is less critical).

After step 618, the method 600 may proceed to step 608 and the drilling execution system 250 may continue to communicate drilling data to the directional guidance system 252.

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Although several example embodiments have been described in detail above, the embodiments described are example only and are not limiting, and those of ordinary skill in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method of operating a drilling system, comprising:
inputting a drill plan into a directional guidance system of the drilling system, the drill plan comprising a slide drilling operation;
sending a drilling instruction from the directional guidance system to a drilling execution system in communication with a BHA of the drilling system to conduct the slide drilling operation;
conducting, with the drilling execution system, the slide drilling operation according to the drilling instruction;
conducting bi-directional communication between the directional guidance system and the drilling execution system during the slide drilling operation, such that signals are sent between the directional guidance system and the drilling execution system simultaneously, the bi-directional communication comprising:
sending a first signal from the drilling execution system to the directional guidance system comprising a parameter of the slide drilling operation;
assessing the first signal with the directional guidance system to determine whether the parameter is within an acceptable range;
if the parameter is not within the acceptable range, sending a second signal from the directional guidance system to the drilling execution system to change an aspect of the slide drilling operation; and
conducting, with the drilling execution system, the slide drilling operation according to the second signal before the slide drilling operation is completed, wherein the conducting of the slide drilling operation includes sending additional signals between the directional guidance system and the drilling execution system simultaneously to correct the parameter not within the acceptable range during the slide drilling operation.

2. The method of claim 1, wherein the parameter of the slide drilling operation is one of a current slide score, a toolface distribution to target, a resultant slide vector, a current slide distance, a remaining slide distance, a bit proximity to steering line, an average rate of penetration, a current rate of penetration, qualitative information describing adherence of a wellbore of the slide drilling operation to the drill plan, real-time information about actual current inclination and azimuth of the BHA, and real-time information about projected inclination and azimuth of the BHA.

3. The method of claim 1, wherein the assessing the first signal with the directional guidance system to determine whether the parameter is within an acceptable range accounts for criticality of directional control of the BHA.

4. The method of claim 1, wherein the assessing the first signal with the directional guidance system to determine whether the parameter is within an acceptable range accounts for criticality of a drilled wellbore of the slide drilling operation as compared to the drill plan.

5. The method of claim 1, wherein the acceptable range is received by the directional guidance system with the drill plan.

6. The method of claim 1, wherein the aspect of the slide drilling operation is a length of the slide distance.

7. The method of claim 1, wherein the aspect of the slide drilling operation is a direction of the slide.

8. The method of claim 1, wherein the bi-directional communication between the directional guidance system and the drilling execution system is continuous during the slide drilling operation.

9. The method of claim 1, wherein the aspect of the slide drilling operation is a direction of the slide.

10. The method of claim 1, wherein the bi-directional communication between the directional guidance system and the drilling execution system is continuous during the slide drilling operation.

11. A method of operating a drilling rig, comprising:
conducting a slide drilling operation with an execution drilling system of the drilling rig;
sending signals between the execution drilling system and a directional guidance system simultaneously, including a first signal from the drilling execution system to the directional guidance system on the drilling rig, the first signal including a measurement of the performance of the slide drilling operation;
assessing the first signal with the directional guidance system;
sending a second signal from the directional guidance system to the drilling execution system to vary a parameter of the slide drilling operation to improve the performance of the slide drilling operation;
at the same time as sending the second signal, sending a third signal from the drilling execution system to the directional guidance system, the third signal including an updated measurement of the performance of the slide drilling operation subsequent to the first signal; and
conducting, with the drilling execution system, the slide drilling operation according to the second signal before the slide drilling operation is completed.

12. The method of claim 11, wherein the assessing the first signal with the directional guidance system accounts for criticality of directional control by the drilling execution system.

13. The method of claim 11, wherein the second signal comprises a revised slide drilling instruction.

14. The method of claim 11, further comprising conducting bi-directional communication between the directional guidance system and the drilling execution system continuously during the slide drilling operation.

15. A drilling apparatus comprising:
a drill string comprising a plurality of tubulars and a bottom hole assembly (BHA) operable to perform a slide drilling operation;
a directional guidance system configured to generate drilling instructions for the slide drilling operation; and
a drilling execution system configured to direct the BHA to conduct the slide drilling operation according to the drilling instructions, wherein the directional guidance system and the drilling execution system engage in bi-directional communication during the slide drilling operation, such that signals are sent between the directional guidance system and the drilling execution system simultaneously, comprising:

sending a first signal from the drilling execution system to the directional guidance system that includes a parameter of the slide drilling operation;

assessing the first signal with the directional guidance system to determine whether the parameter is within an acceptable range;

if the parameter is not within the acceptable range, sending a second signal from the directional guidance system to the drilling execution system to change an aspect of the slide drilling operation; and conducting, with the drilling execution system, the slide drilling operation according to the second signal before the slide drilling operation is completed, wherein the conducting of the slide drilling operation includes sending additional signals between the directional guidance system and the drilling execution system simultaneously to change the parameter to be within the acceptable range.

16. The drilling apparatus of claim 15, wherein the parameter of the slide drilling operation is one of a current slide score, a toolface distribution to target, a resultant slide vector, a current slide distance, a remaining slide distance, a bit proximity to steering line, an average rate of penetration, a current rate of penetration, qualitative information describing adherence of a wellbore of the slide drilling operation to a drill plan, real-time information about actual current inclination and azimuth of the BHA, and real-time information about projected inclination and azimuth of the BHA.

17. The drilling apparatus of claim 15, wherein the assessing the first signal with the directional guidance system to determine whether the parameter is within an acceptable range accounts for the criticality of directional control of the BHA.

18. The drilling apparatus of claim 15, wherein the assessing the first signal with the directional guidance system to determine whether the parameter is within an acceptable range accounts for the criticality of a drilled wellbore of the slide drilling operation as compared to a drill plan for the slide drilling operation.

19. The drilling apparatus of claim 15, wherein the acceptable range is received by the directional guidance system with a drill plan.

20. The drilling apparatus of claim 15, wherein the aspect of the slide drilling operation is a length of the slide distance.

* * * * *